United States Patent
Dey (10) Patent No.: US 11,121,945 B2
(45) Date of Patent: Sep. 14, 2021

(54) METHODS, SYSTEMS, AND COMPUTER READABLE MEDIA FOR REQUEST RESPONSE PROCESSING

(71) Applicant: Oracle International Corporation, Redwood Shores, CA (US)

(72) Inventor: Debdulal Dey, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 64 days.

(21) Appl. No.: 16/740,070

(22) Filed: Jan. 10, 2020

(65) Prior Publication Data

US 2021/0218646 A1    Jul. 15, 2021

(51) Int. Cl.
| | |
|---|---|
| *G06F 15/173* | (2006.01) |
| *H04L 12/24* | (2006.01) |
| *H04L 29/06* | (2006.01) |
| *H04L 29/08* | (2006.01) |

(52) U.S. Cl.
CPC ...... *H04L 41/5093* (2013.01); *H04L 67/1078* (2013.01); *H04L 67/16* (2013.01); *H04L 67/306* (2013.01); *H04L 67/42* (2013.01)

(58) Field of Classification Search
CPC ..... H04L 41/5093; H04L 67/16; H04L 67/42; H04L 67/306; H04L 67/1078
See application file for complete search history.

(56) References Cited

U.S. PATENT DOCUMENTS

| | | | |
|---|---|---|---|
| 2004/0058694 | A1* | 3/2004 | Mendiola ............ H04M 3/5322 455/466 |
| 2016/0105785 | A1 | 4/2016 | Wiant et al. |
| 2017/0220612 | A1 | 8/2017 | Crossley et al. |
| 2017/0300966 | A1 | 10/2017 | Dereszynski et al. |
| 2018/0309880 | A1 | 10/2018 | Aravamudhan et al. |
| 2019/0102266 | A1 | 4/2019 | Park et al. |
| 2019/0104082 | A1* | 4/2019 | Efimov .................. H04L 47/76 |

* cited by examiner

*Primary Examiner* — Yves Dalencourt
(74) *Attorney, Agent, or Firm* — Jenkins, Wilson, Taylor & Hunt, P.A.

(57) ABSTRACT

Methods, systems, and computer readable media for request response processing. A method includes establishing a request topic and a response topic for distributing messages between clients and services executing on a distributed computing system. The method includes posting, in the request topic, request messages from the clients, each request message including a unique client identifier, such that the services consume the request messages from the request topic. The method includes posting, in the response topic, response messages from the services responsive to the request messages. The services post the response messages to response partitions of the response topic using the unique client identifiers. The clients consume the response messages using the unique client identifiers to ensure that each client consumes a respective responsive message responsive to a respective request message from the client.

18 Claims, 5 Drawing Sheets

METHODS, SYSTEMS, AND COMPUTER READABLE MEDIA FOR REQUEST RESPONSE PROCESSING

TECHNICAL FIELD

The subject matter described herein relates to methods and systems for request response processing. More particularly, the subject matter described herein relates to methods, systems, and computer readable media for request response processing using a central messaging bus implemented on a distributed computing system.

BACKGROUND

Telecommunications service providers typically provide numerous voice and/or data services to subscribers using wireline and/or wireless communications networks. Examples of such services include cellular telephony, access to the Internet, gaming, broadcasting or multicasting of audio, video, and multimedia programming, and so on. User equipment such as cell phones, personal data assistants, smart phones, text messaging devices, global positioning system ("GPS") devices, network interface cards, notebook computers, and desktop computers, may access the services provided by the communications networks over an air interface with one or more base stations.

Internet of Things (IoT) sensors and devices are expected to drive data traffic growth multifold. The $3^{rd}$ Generation Partnership Project (3GPP) describe a 5G network architecture to enable IoT sensors and devices across industries for their interworking with the 3GPP network. Telecommunications service providers can use offline and online charging functions to keep track of the charges incurred by each device for using the various services.

The 3GPP standards groups have defined a set of specifications that may be used to implement online charging systems and offline charging systems to cover charging in various network domains. Processing charging requests, however, may be challenging in distributed computing systems that include charging functions executing in parallel given the growth expected in IoT sensors and devices on 5G networks.

Accordingly, there exists a need for methods, systems, and computer readable media for request response processing.

SUMMARY

Methods, systems, and computer readable media for request response processing are disclosed. A system includes a distributed computing system including a plurality of processors. The system includes a central messaging bus implemented on the distributed computing system. The central messaging bus is configured for establishing a request topic and a response topic for distributing a plurality of messages between a plurality of clients and a plurality of services executing on the distributed computing system The central messaging bus is configured for posting, in the request topic, a plurality of request messages from the plurality of clients, each client being associated with one or more unique client identifiers, each request message including one of the one or more unique client identifiers for the respective client posting the request message. The plurality of services consume the request messages from the request topic.

The central messaging bus is configured for posting, in the response topic, a plurality of response messages from the plurality of services responsive to the request messages. The plurality of services post the response messages to a plurality of response partitions of the response topic using the unique client identifiers. The plurality of clients consume the response messages using the unique client identifiers to ensure that each client consumes a respective responsive message responsive to a respective request message from the client.

A method includes, at a central messaging bus implemented on a distributed computing system comprising a plurality of processors, establishing a request topic and a response topic for distributing a plurality of messages between a plurality of clients and a plurality of services executing on the distributed computing system. The method includes posting, in the request topic, a plurality of request messages from the plurality of clients, each client being associated with one or more unique client identifiers, each request message including one of the one or more unique client identifiers for the respective client posting the request message. The plurality of services consume the request messages from the request topic.

The method includes posting, in the response topic, a plurality of response messages from the plurality of services responsive to the request messages. The plurality of services post the response messages to a plurality of response partitions of the response topic using the unique client identifiers. The plurality of clients consume the response messages using the unique client identifiers to ensure that each client consumes a respective responsive message responsive to a respective request message from the client.

In some examples, the request topic is partitioned based on the unique client identifiers of the plurality clients. The method can include randomly assigning each service of the plurality of services to a partition of the request topic.

In some examples, each client of the plurality of clients includes a network gateway in a telecommunications network. Each service of the plurality of services can include a charging service configured for charging and providing credit control services for a plurality of subscribers of a telecommunications network.

In some examples, the method includes determining a number of unique client identifiers for a client of the plurality of clients based on a volume of transactions for the client or a projected volume of transactions for the client. The method can include, for each client of the plurality of clients, determining each unique client identifier of the one or more client identifiers based on a hash of an account identifier and a total number of partitions of the request topic.

In some examples, the method includes, at each client of the plurality of clients, assigning a respective unique client identifier of the one or more unique client identifiers for the client to each request message of the client in a round robin process to evenly distribute the request messages of the client across the one or more unique client identifiers.

In some examples, the method includes, in response to determining an increase in a volume of client transactions from the plurality of clients, increasing a total number of partitions for the request topic.

In some examples, at each service of the plurality of services, the service is configured for sequentially processing each request message consumed from the response topic.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for request response processing are disclosed. A system includes a distributed computing system including a plurality of processors. The system includes a central messaging bus implemented on the distributed computing system. The central message bus can be useful, e.g., in a 5G telecommunications network core.

The 3GPP 5G specifications significantly change the way that components in the telecommunication network core communicate with each other. The core network in 5G follows a service-based architecture where network elements advertise and provide services which can be consumed using APIs by other network elements in the telecommunications network core. This allows for the adoption of web scale technologies and software in telecommunications networks.

The central messaging bus is configured for establishing a request topic and a response topic for distributing a plurality of messages between a plurality of clients and a plurality of services executing on the distributed computing system The central messaging bus is configured for posting, in the request topic, a plurality of request messages from the plurality of clients, each client being associated with one or more unique client identifiers, each request message including one of the one or more unique client identifiers for the respective client posting the request message. The plurality of services consume the request messages from the request topic.

The central messaging bus is configured for posting, in the response topic, a plurality of response messages from the plurality of services responsive to the request messages. The plurality of services post the response messages to a plurality of response partitions of the response topic using the unique client identifiers. The plurality of clients consume the response messages using the unique client identifiers to ensure that each client consumes a respective responsive message responsive to a respective request message from the client.

The central messaging bus ensures that response messages are returned to originating clients in real-time or near real-time even though the services are executing in parallel on the distributed computing system. The central messaging bus also removes the need for locking data items as may be necessary in some synchronous systems. These features can be useful, e.g., for processing charging requests from IoT devices on 5G networks and other networks. The central messaging bus can use, e.g., Kafka as an underlying delivery mechanism.

The system uses unique client identifiers to carry out a mailbox pattern for delivery of response messages. The mailbox pattern can be seen, e.g., in physical mail box delivery scenarios, and as the name suggests this pattern describes a pattern about message delivery.

For example, if a message has to be delivered to a person B from a person A, and the response from B should come back A, one way to ensure the response will come back to A is to use a self-addressed envelope along with the message. As described further below, when a set of clients send requests that can be processed by any consumer in a group but the response of a message should be sent back to the by the sending client, the client can provide a unique identifier in the message that will help the consumer to generate response with same ID.

Figure 1:
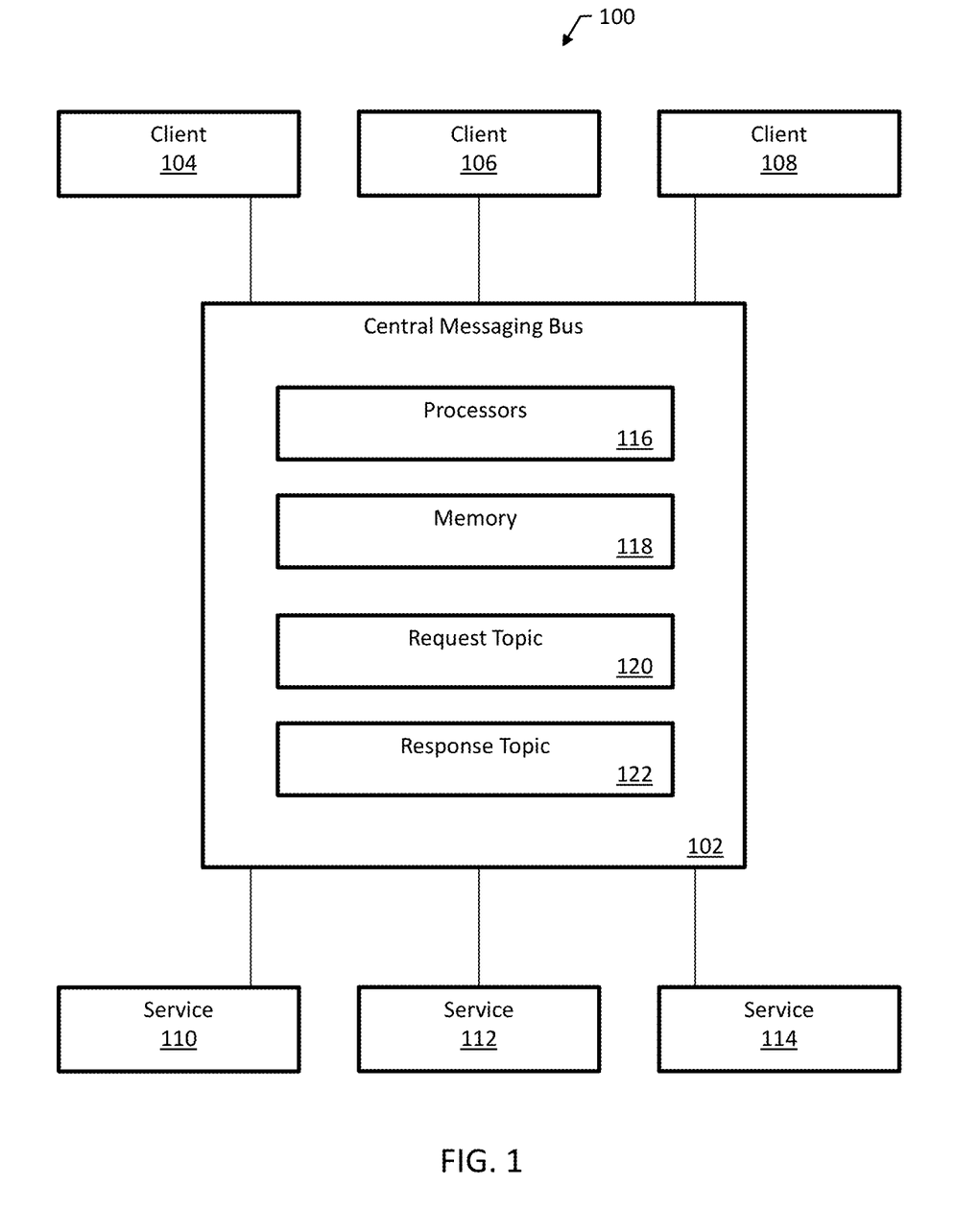
FIG. 1 is a block diagram of an example network environment for request response processing.

FIG. 1 is a block diagram of an example network environment 100 for request response processing. Network environment 100 can include, e.g., a core network of a telecommunications network. The telecommunications network can be a 5G network. For purposes of illustration, the core network of the telecommunications network is not shown in detail in FIG. 1.

Network environment 100 includes a central messaging bus 102 configured for exchanging messages in a distributed computing system. Central messaging bus 102 can be used such that all incoming data is first placed on central messaging bus 102 and all outgoing data is then read from central message bus 102.

Central messaging bus 102 centralizes communication between producers of data and consumers of the data. As shown in FIG. 1, central messaging bus 102 is configured to exchange messages between a number of clients 104, 106, and 108 and a number of services 110, 112, and 114.

Centralizing communication can be useful in a distributed computing system with multiple applications executing in parallel. In some systems, data exists on various computing nodes, all of which need to interact with each other over various channels. In some cases, different channels require different custom protocols and communication methods, and moving data between systems can then become complicated and burdensome.

Central messaging bus 102 is implemented on a distributed computing system that includes processors 116 and memory 118 storing instructions for the processors 116. Central messaging bus 102 is configured for establishing a request topic 120 and a response topic 122 for distributing messages between clients 104, 106, and 108 and services 110, 112, and 114 executing on the distributed computing system.

Central messaging bus 102 is configured for posting, in request topic 120, request messages from clients 104, 106, and 108. Each client of clients 104, 106, and 108 is associated with one or more unique client identifiers, and each request message includes one of the one or more unique client identifiers for the respective client posting the request message. Services 110, 112, and 114 consume the request messages from request topic 120.

Central messaging bus 102 is configured for posting, in response topic 122, response messages from services 110, 112, and 114 responsive to the request messages. Services 110, 112, and 114 post the response messages to a plurality of response partitions of the response topic using the unique client identifiers. Clients 104, 106, and 108 consume the response messages using the unique client identifiers to ensure that each client consumes a respective responsive message responsive to a respective request message from the client.

In some examples, request topic 120 is partitioned based on the unique client identifiers of clients 104, 106, and 108. Central messaging bus 102 can be configured for randomly assigning each service of the plurality of services to a partition of the request topic.

In some examples, each client of clients 104, 106, and 108 includes a network gateway in a telecommunications network. Each service of the services 110, 112, and 114 can include a charging service configured for charging and providing credit control services for subscribers of a telecommunications network.

In some examples, central messaging bus 102 is configured for determining a number of unique client identifiers for a client of clients 104, 106, and 108 based on a volume of transactions for the client or a projected volume of transactions for the client. Then, for each client of clients 104, 106, and 108, the client is configured for determining each unique client identifier of the one or more client identifiers based on a hash of an account identifier and a total number of partitions of request topic 120.

In some examples, at each client of clients 104, 106, and 108, the client is configured for assigning a respective unique client identifier of the one or more unique client identifiers for the client to each request message of the client in a round robin process to evenly distribute the request messages of the client across the one or more unique client identifiers.

In some examples, in response to determining an increase in a volume of client transactions from the plurality of clients, central messaging bus is configured for increasing a total number of partitions for request topic 120.

In some examples, at each service of services 110, 112, and 114, the service is configured for sequentially processing each request message consumed from the response topic. Sequentially processing request messages can be useful, e.g., to avoid having to lock data to avoid collisions in a parallel processing system.

The 3$^{rd}$ Generation Partnership Project (3GPP) is a collaboration between groups of telecommunications standards associations. The 3GPP defined mobile phone system specifications for telecommunications networks including 3G, 4G, and Long Term Evolution (LTE) networks.

The next generation network for 3GPP is the 5G network. The 5G specifications target high data rates, reduced latency, energy saving, cost reduction, higher system capacity, and increasing numbers of connected devices. In some examples, network environment 100 is part of a 5G core network.

The 3GPP has defined a service-based architecture for its next generation 5G core network. In a service-based architecture, services are provided to software components by application components, typically through a communication protocol over a data communications network.

A service can be, e.g., a discrete function that can be accessed remotely and consumed and updated independently of other services in the system. Different services can be used together to provide the functionality of a larger functional system such as a software application. The service-based architecture can integrate distributed and separately-maintained software components.

In the 5G architecture, the focus is on loosely coupled services as opposed to tightly coupled functions and point-to-point interfaces. HTTP/2 is used as a service-based application layer protocol. The 5G architecture supports native control and user plane separation. The 5G architecture supports the unified data management framework, an expanded and unified policy framework, and an expanded network exposure functionality.

An example 5G telecommunications network core can include a network slice selection function (NSSF), a network exposure function (NEF), a network function repository function (NRF), a policy control function (PCF), a unified data management (UDM) function, an application function (AF), a security edge protection proxy (SEPP), an EIR, an interworking function (IWF), an access and mobility management function (AMF), an authentication server function (AUSF), a bootstrapping server function (BSF), and a session management function (SMF).

Subscribers of telecommunications services, such as cellular voice and data subscriptions, typically pay a monthly fee for services that often include allowances. For example, a monthly allowance for a number of minutes, a number of Short Message Service ("SMS") texts, gigabytes of data, etc. However, service providers, particularly in the telecommunications domain, are increasingly interested in offering subscription periods that are significantly shorter than a month, e.g., in order to better manage subscriber spending patterns.

Figure 2:
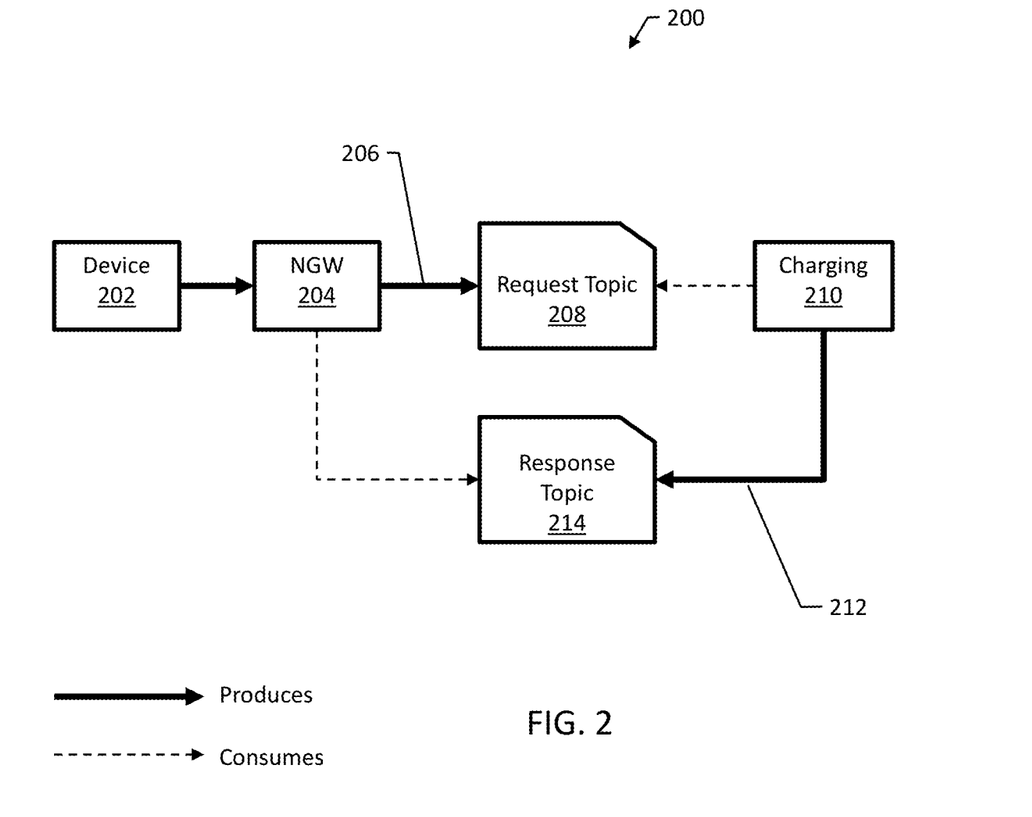
FIG. 2 is a block diagram illustrating an example message exchange using the central messaging bus of FIG. 1.

FIG. 2 is a block diagram illustrating an example message exchange 200 using the central messaging bus 102 of FIG. 1.

As shown in FIG. 2, a device 202 initiates the message exchange by sending a charging request to a network gateway 204. Network gateway 204 posts a request message 206 to a request topic 208. Network gateway 204 includes a unique client identifier within request message 206. The client identifier is unique amongst a group of all of the clients of charging service 210.

Charging service 210 consumes the request message 206 and, in response, prepares a response message 212. Charging service 210 posts response message 212 to a response topic 214 using the unique client identifier. Charging service 210 can identify a particular partition within response topic 214 based on the unique client identifier and post response message 212 to that partition. Then, NGW 204 consumes request message 212.

Even though charging service 210 may be implemented by a number of charging services executing in parallel, response message 212 can be certain to be returned to NGW 204 and ultimately device 202 due to the use of the unique client identifier.

Device 202 can be any appropriate type of electronic device. For example device 202 can be a mobile phone, tablet, or a laptop. Device 202 can be wireless-enabled sensor or other IoT device.

Charging service 210 in general is a runtime engine that provides online charging for a communications session. Charging service 210 can be coupled to a Billing and Revenue Management System ("BRM"). BRM stores information for each registered user/customer of a telecommunications network, and for each customer determines charging parameters such as usage rates, bundles of available minutes and promotions, current balances, allowances, etc.

Online charging through charging service 210 refers to a charging mechanism where charging information can affect, in real-time, the service rendered. Therefore, a direct interaction of the charging mechanism with session/service control, provided by a BRM, can be useful.

In online charging, charging information for network resource usage is collected concurrently with the resource usage. In some cases, authorization for the network resource usage must be obtained by the network via a BRM prior to the actual resource usage based on the charging results returned by charging service 210. The charging decisions in charging service 210 are made based on the allowable resources for a user that are obtained from a BRM and maintained in charging service 210.

In some examples, charging service 210 supports an IP Multimedia Subsystem (IMS) network in accordance with the 3GPP standards. As opposed to post-paid charging, where the services are provided first and the IMS user is billed later, charging service 210 can provide pre-paid charging, where the IMS user has to have an account balance prior to services being provided, and the account balance is debited as the services are provided.

In some examples, charging service 210 includes an online charging function, an account balance management function ("ABMF"), and a rating function ("RF"). The ABMF maintains an amount of service units in an account of an IMS user. The rating function determines the cost of service usage according to a tariff defined by the network operator. The online charging function utilizes the ABMF and the rating function in order to perform online charging.

Additional network/service elements in the IMS network in one embodiment, not shown in FIG. 2, such as a Proxy-Call Session Control Function ("P-CSCE"), a Session-Call Session Control Function ("S-CSCE"), and an application server ("AS"), include Charging Trigger Functions ("CTF"). These CTFs are adapted to monitor service usage and to generate charging messages responsive to charging events. The CTFs then transmit the charging messages to charging service 210 to provide online charging for the service usage.

Online charging may be performed as direct debiting or unit reservation. For direct debiting, the online charging function debits the units immediately from the account of the user for an individual transaction. For unit reservation, the online charging function grants a quota of units from the account of the user, and provides the quota of units to the requesting service element.

The requesting service element then performs budget control by monitoring service usage and deducting from the quota accordingly. If the quota of units expires, then the service element requests another quota of units, and the process continues. After the service has terminated, the total amount of units to deduct from the user's account is resolved.

Charging service 210 may be configured for rating and providing credit control services for subscribers of other resources in addition to telecommunications network resources. For example, charging service 210 can be used for charging of various features provided by IoT devices, for example, by charging for rides on public transportation, charging for parking cars in parking lots, and charging for various types of rental applications.

Figure 3:
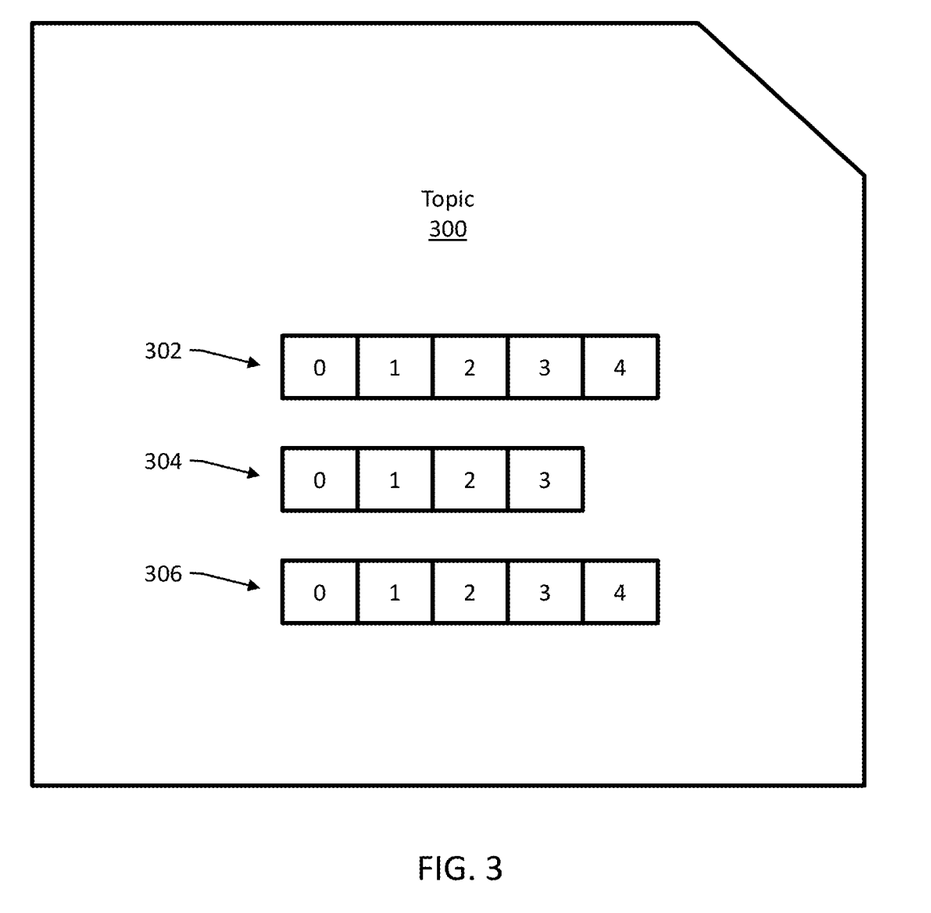
FIG. 3 is a diagram illustrating an example Kafka topic.

FIG. 3 is a diagram illustrating an example Kafka topic 300. Topic 300 could be, for example, the request topic 120 or the response topic 122 of FIG. 1.

Topic 300 includes three partitions 302, 304, and 306. The first partition 302 includes five messages, the second partition 304 includes four messages, and the third partition 306 includes five messages. Each message is labelled with an offset, which is an identifier within a partition.

Kafka, in general, is a messaging system. All incoming data is first placed in Kafka and all outgoing data is read from Kafka. Kafka centralizes communication between producers of data and consumers of that data.

Kafka is a distributed messaging system providing fast, highly scalable and redundant messaging through a publisher/subscriber model. Kafka's distributed design can provide several advantages.

Kafka allows a large number of permanent or ad-hoc consumers. Kafka is highly available and resilient to node failures and supports automatic recovery. In real world data systems, these characteristics make Kafka useful for communication and integration between components of large scale data systems.

Kafka messages are organized into topics. For a producer to send a message, the producer sends it to a specific topic. For a consumer to read a message, the consumer reads it from a specific topic. A consumer pulls messages off of a Kafka topic while producers push messages into a Kafka topic.

Kafka, as a distributed system, runs in a cluster. Each node in the cluster is called a Kafka broker.

Kafka topics are divided into a number of partitions. Partitions allow you to parallelize a topic by splitting the data in a particular topic across multiple brokers.

Each partition can be placed on a separate machine to allow for multiple consumers to read from a topic in parallel. Consumers can also be parallelized so that multiple consumers can read from multiple partitions in a topic allowing for very high message processing throughput.

Each message within a partition has an identifier called its offset. The offset specifies the ordering of messages as an immutable sequence. Kafka maintains the message ordering.

Consumers can read messages starting from a specific offset and are allowed to read from any offset specified, allowing consumers to join the cluster at any point in time as needed. Given these constraints, each specific message in a Kafka cluster can be uniquely identified by a tuple consisting of the message's topic, partition, and offset within the partition.

Kafka retains messages for a configurable period of time. Consumers are configured to adjust their behaviour accordingly.

For instance, if Kafka is configured to keep messages for a day and a consumer is down for a period of longer than a day, the consumer will lose messages. However, if the consumer is down for an hour it can begin to read messages again starting from its last known offset. From the point of view of Kafka, it generally does not maintain a state on what the consumers are reading from a topic.

Consumers read from any single partition, allowing the system to scale throughput of message consumption in a similar fashion to message production. Consumers can also be organized into consumer groups for a given topic—each consumer within the group reads from a unique partition and the group as a whole consumes all messages from the entire topic.

If the system has more consumers than partitions then some consumers will be idle because they have no partitions to read from. If you have more partitions than consumers then consumers will receive messages from multiple partitions. If you have equal numbers of consumers and partitions, each consumer reads messages in order from exactly one partition.

Kafka makes the following guarantees about data consistency and availability:

(1) Messages sent to a topic partition will be appended to the commit log in the order they are sent, (2) a single consumer instance will see messages in the order they appear in the log, (3) a message is 'committed' when all in sync replicas have applied it to their log, and (4) any committed message will not be lost, as long as at least one in sync replica is alive.

The first and second guarantee ensure that message ordering is preserved for each partition. Note that message ordering for the entire topic is not guaranteed. The third and fourth guarantee ensure that committed messages can be retrieved.

In Kafka, the partition that is elected the leader is responsible for syncing any messages received to replicas. Once a replica has acknowledged the message, that replica is considered to be in sync.

Kafka producers and consumers can be configured to different levels of consistency. For a producer we have three choices.

On each message we can (1) wait for all in sync replicas to acknowledge the message, (2) wait for only the leader to acknowledge the message, or (3) do not wait for acknowledgement.

Each of these methods have their merits and drawbacks and it is up to the system implementer to decide on the appropriate strategy for their system based on factors like consistency and throughput.

On the consumer side, in general, we can only read committed messages (i.e., those that have been written to all in sync replicas). Given that, we have three methods of providing consistency as a consumer:

(1) receive each message at most once, (2) receive each message at least once, or (3) receive each message exactly once.

By using Kafka as a message bus we achieve a high level of parallelism and decoupling between data producers and data consumers, making the architecture more flexible and adaptable to change.

Figure 4:
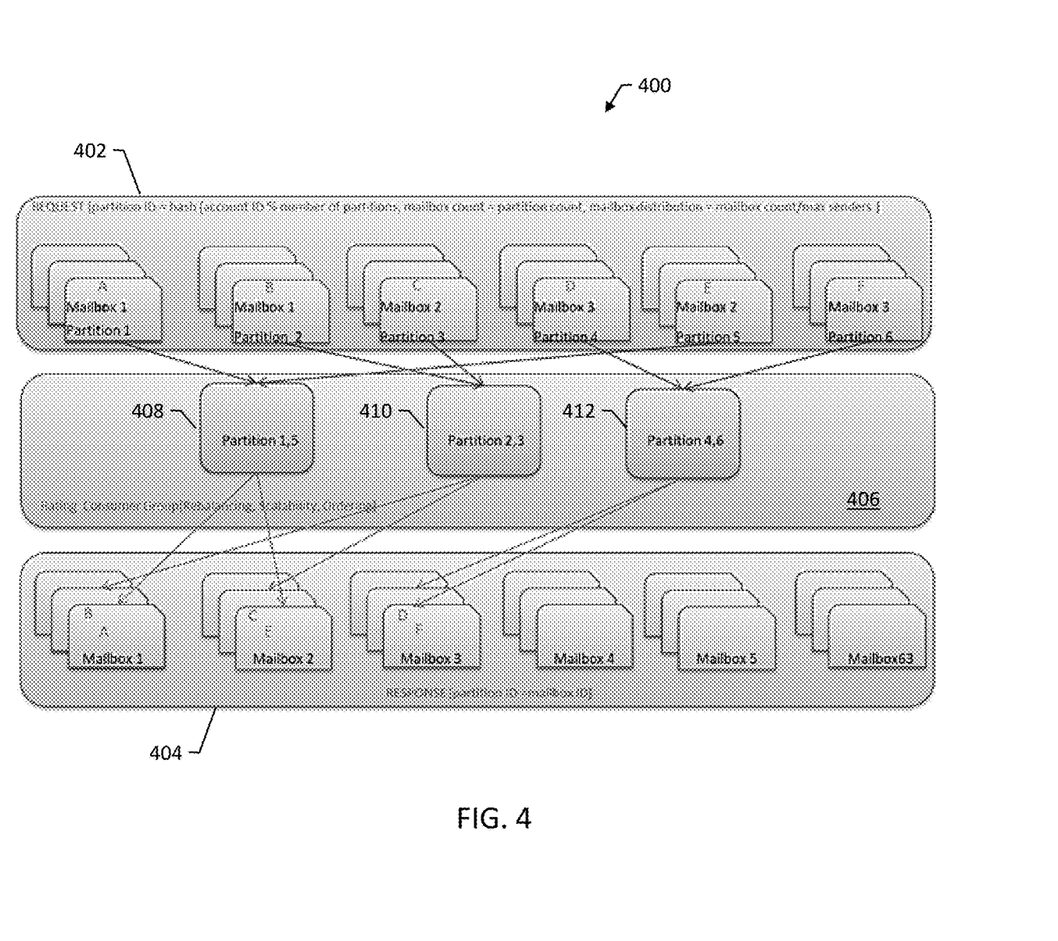
FIG. 4 is a diagram of an example system to illustrate assignment of mailbox numbers to partitions.

FIG. 4 is a diagram of an example system 400 to illustrate assignment of mailbox numbers to partitions. A mailbox number is one of the unique client identifiers used for request response processing.

System 400 includes a request topic 402, a response topic 404, and a rating consumer group 406. Rating consumer group 406 includes a number of agents configured to execute in parallel and to provide rating and credit control services for subscribers of a telecommunications network.

In a cloud-based charging system, there may be multiple network gateways that will generate requests for charging to rate and provide credit control services for the subscriber. System 400 uses Kafka topics as the underlying delivery mechanism for exchanging messages between subscribers and agents of rating consumer group 406. For scalability, request topic 402 is partitioned based on the mailbox number of the subscriber.

Rating consumer group 406 processes the messages from the network gateways for requesting rating and credit control services. The assignment of agents from rating consumer group 406 to partitions of request topic 402 will be performed randomly by Kafka.

Once the messages are processed, the responses will be put into response topic 404. The initial senders of the request messages become consumers of response topic 404, but in this case, the initial sender of the message needs to ensure that it will get back the response of the message, even though the agents of rating consumer group 406 are executing in parallel, and so Kafka should not randomly assign partitions of response topic 404 to the consumers of response topic 404.

The number of mail boxes can be driven by volume of transactions or expectation of the volume of transactions to start with. Each sender owns a set of mail boxes, e.g., distributed evenly.

Each request will be stamped with mail box number in a round robin way by each sender service based on mail boxes assigned to the senders. Agents from rating consumer group 404 will post the responses using mail box number as keys in response topic 406. This will ensure scalability on client processing. The mail boxes are Kafka partitions, but the partitions may be manually assigned using Kafka manual partition assignment.

In some examples, the assignment of request messages to partitions in request topic 402 is carried out using a hash function based on an account identifier and a total number of partitions within response topic 402. For example, the partition identifier can be determined as follows:

partition ID=hash (account ID % number of partitions,mailbox count=partition count,mailbox distribution=mailbox count/max senders)

Similarly, for response topic 404, the partition identifier can be determined as follows:

partition ID=mailboxID.

In the example shown in FIG. 4, request topic 402 includes six partitions, and six mailbox numbers are shown. Mailbox 1 is assigned to two partitions, partition 1 and partition 2. Mailbox 2 is assigned to two partitions, partition 3 and partition 5. Mailbox 3 is assigned to two partitions, partition 4 and partition 6.

A first agent 408 of rating consumer group 406 is randomly assigned to consume request messages from partitions 1 and 5 of request topic 402. Agent 408 processes request messages from partitions 1 and 5. Partition 1 includes request messages labelled as mailbox 1, and partition 5 includes request messages labelled as mailbox 2.

When agent 408 generates response messages responsive to the request messages, agent 408 uses the mailbox numbers to determine which partition to post the response messages to on response topic 404. Response messages for request messages labelled mailbox 1 go to the partition for mailbox 1, and response messages for request messages labelled mailbox 2 go to the partition for mailbox 2.

A second agent 410 of rating consumer group 406 is randomly assigned to consume from partitions 2 and 3 of request topic 402. Agent 410 processes request messages from partitions 2 and 3. Partition 2 includes request messages labelled as mailbox 1, and partition 3 includes request messages labelled as mailbox 2.

When agent 410 generates response messages responsive to the request messages, agent 410 uses the mailbox numbers to determine which partition to post the response messages to on response topic 404. Response messages for request messages labelled mailbox 1 go to the partition for mailbox 1, and response messages for request messages labelled mailbox 2 go to the partition for mailbox 2.

A third agent 412 of rating consumer group 406 is randomly assigned to consume from partitions 4 and 6 of request topic 402. Agent 412 processes request messages from partitions 4 and 6. Partition 4 includes request messages labelled as mailbox 3, and partition 6 includes request messages labelled as mailbox 3 too.

When agent 412 generates response messages responsive to the request messages, agent 412 uses the mailbox numbers to determine which partition to post the response messages to on response topic 404. Response messages for request messages labelled mailbox 3 go to the partition for mailbox 3.

Figure 5:
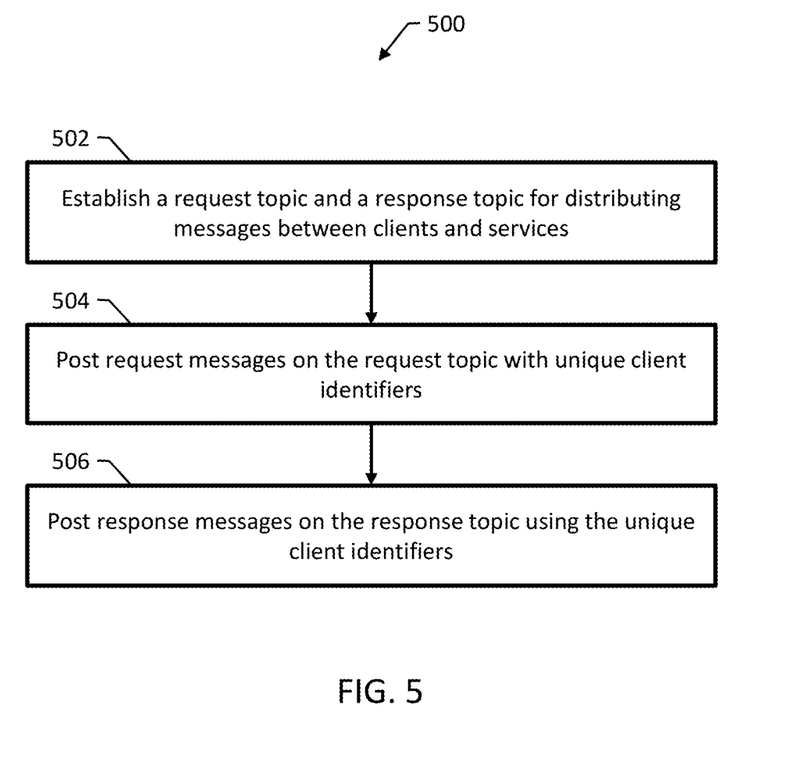
FIG. 5 is a flow diagram of an example method for request response processing.

FIG. 5 is a flow diagram of an example method 500 for request response processing. The method 500 may be useful, e.g., in a 5G telecommunications network core.

The core network in 5G follows a service-based architecture where network elements advertise and provide services which can be consumed using APIs by other network elements in the telecommunications network core. This allows for the adoption of web scale technologies and software in telecommunications networks.

The method 500 includes, at a central messaging bus implemented on a distributed computing system comprising a plurality of processors, establishing a request topic and a response topic for distributing a plurality of messages between a plurality of clients and a plurality of services executing on the distributed computing system (502).

The central messaging bus may be implemented using Kafka. Kafka is a publish-subscribe messaging system. Kafka allows topics to be defined to where applications can add, process and reprocess data (messages).

The method 500 includes posting, in the request topic, a plurality of request messages from the plurality of clients, each client being associated with one or more unique client identifiers, each request message including one of the one or more unique client identifiers for the respective client posting the request message (504). The plurality of services consume the request messages from the request topic.

The method includes posting, in the response topic, a plurality of response messages from the plurality of services responsive to the request messages (506). The plurality of services post the response messages to a plurality of response partitions of the response topic using the unique client identifiers. The plurality of clients consume the response messages using the unique client identifiers to ensure that each client consumes a respective responsive message responsive to a respective request message from the client.

In some examples, the request topic is partitioned based on the unique client identifiers of the plurality clients. The method 500 can include randomly assigning each service of the plurality of services to a partition of the request topic.

In some examples, each client of the plurality of clients includes a network gateway in a telecommunications network. Each service of the plurality of services can include a charging service configured for charging and providing credit control services for a plurality of subscribers of a telecommunications network.

In some examples, the method 500 includes determining a number of unique client identifiers for a client of the plurality of clients based on a volume of transactions for the client or a projected volume of transactions for the client. The method 500 can include, for each client of the plurality of clients, determining each unique client identifier of the one or more client identifiers based on a hash of an account identifier and a total number of partitions of the request topic.

In some examples, the method 500 includes, at each client of the plurality of clients, assigning a respective unique client identifier of the one or more unique client identifiers for the client to each request message of the client in a round robin process to evenly distribute the request messages of the client across the one or more unique client identifiers.

In some examples, the method 500 includes, in response to determining an increase in a volume of client transactions from the plurality of clients, increasing a total number of partitions for the request topic.

In some examples, at each service of the plurality of services, the service is configured for sequentially processing each request message consumed from the response topic.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for request response processing, the system comprising:
   a distributed computing system comprising a plurality of processors; and
   a central messaging bus implemented on the distributed computing system, wherein the central messaging bus is configured for:
     establishing a request topic and a response topic for distributing a plurality of messages between a plurality of clients and a plurality of services executing on the distributed computing system;
     posting, in the request topic, a plurality of request messages from the plurality of clients, each client being associated with one or more unique client identifiers, each request message including one of the one or more unique client identifiers for the respective client posting the request message, wherein the plurality of services consume the request messages from the request topic; and
     posting, in the response topic, a plurality of response messages from the plurality of services responsive to the request messages, wherein the plurality of services post the response messages to a plurality of response partitions of the response topic using the unique client identifiers, and wherein the plurality of clients consume the response messages using the unique client identifiers to ensure that each client consumes a respective responsive message responsive to a respective request message from the client;

wherein, for each client of the plurality of clients, the client is configured for determining each of the unique client identifiers for the client based on a hash of an account identifier and a total number of partitions of the request topic.

2. The system of claim 1, wherein the request topic is partitioned based on the unique client identifiers of the plurality clients.

3. The system of claim 2, wherein the central messaging bus is configured for randomly assigning each service of the plurality of services to a partition of the request topic.

4. The system of claim 1, wherein each client of the plurality of clients comprises a network gateway in a telecommunications network.

5. The system of claim 1, wherein each service of the plurality of services comprises a charging service configured for charging and providing credit control services for a plurality of subscribers of a telecommunications network.

6. The system of claim 1, wherein the central messaging bus is configured for determining a number of unique client identifiers for a client of the plurality of clients based on a volume of transactions for the client or a projected volume of transactions for the client.

7. The system of claim 1, wherein, at each client of the plurality of clients, the client is configured for assigning a respective unique client identifier of the one or more unique client identifiers for the client to each request message of the client in a round robin process to evenly distribute the request messages of the client across the one or more unique client identifiers.

8. The system of claim 1, wherein the central messaging bus is configured for, in response to determining an increase in a volume of client transactions from the plurality of clients, increasing a total number of partitions for the request topic.

9. The system of claim 1, wherein, at each service of the plurality of services, the service is configured for sequentially processing each request message consumed from the response topic.

10. A method for request response processing, the method comprising:
at a central messaging bus implemented on a distributed computing system comprising a plurality of processors:
establishing a request topic and a response topic for distributing a plurality of messages between a plurality of clients and a plurality of services executing on the distributed computing system;
posting, in the request topic, a plurality of request messages from the plurality of clients, each client being associated with one or more unique client identifiers, each request message including one of the one or more unique client identifiers for the respective client posting the request message, wherein the plurality of services consume the request messages from the request topic; and
posting, in the response topic, a plurality of response messages from the plurality of services responsive to the request messages, wherein the plurality of services post the response messages to a plurality of response partitions of the response topic using the unique client identifiers, and wherein the plurality of clients consume the response messages using the unique client identifiers to ensure that each client consumes a respective responsive message responsive to a respective request message from the client;
for each client of the plurality of clients, determining each unique client identifier for the client based on a hash of an account identifier and a total number of partitions of the request topic.

11. The method of claim 10, wherein the request topic is partitioned based on the unique client identifiers of the plurality clients.

12. The method of claim 11, comprising randomly assigning each service of the plurality of services to a partition of the request topic.

13. The method of claim 10, wherein each client of the plurality of clients comprises a network gateway in a telecommunications network.

14. The method of claim 10, wherein each service of the plurality of services comprises a charging service configured for charging and providing credit control services for a plurality of subscribers of a telecommunications network.

15. The method of claim 10, comprising determining a number of unique client identifiers for a client of the plurality of clients based on a volume of transactions for the client or a projected volume of transactions for the client.

16. The method of claim 10, comprising, at each client of the plurality of clients, assigning a respective unique client identifier of the one or more unique client identifiers for the client to each request message of the client in a round robin process to evenly distribute the request messages of the client across the one or more unique client identifiers.

17. The method of claim 10, comprising, in response to determining an increase in a volume of client transactions from the plurality of clients, increasing a total number of partitions for the request topic.

18. A non-transitory computer readable medium comprising computer executable instructions embodied in the non-transitory computer readable medium that when executed by at least one processor of at least one computer cause the at least one computer to perform steps comprising:
at a central messaging bus implemented on a distributed computing system comprising a plurality of processors:
establishing a request topic and a response topic for distributing a plurality of messages between a plurality of clients and a plurality of services executing on the distributed computing system;
posting, in the request topic, a plurality of request messages from the plurality of clients, each client being associated with one or more unique client identifiers, each request message including one of the one or more unique client identifiers for the respective client posting the request message, wherein the plurality of services consume the request messages from the request topic; and
posting, in the response topic, a plurality of response messages from the plurality of services responsive to the request messages, wherein the plurality of services post the response messages to a plurality of response partitions of the response topic using the unique client identifiers, and wherein the plurality of clients consume the response messages using the unique client identifiers to ensure that each client consumes a respective responsive message responsive to a respective request message from the client; and
for each client of the plurality of clients, determining each unique client identifier for the client based on a hash of an account identifier and a total number of partitions of the request topic.

\* \* \* \* \*